United States Patent
Mei et al.

(10) Patent No.: US 7,862,673 B2
(45) Date of Patent: Jan. 4, 2011

(54) SYSTEM AND METHOD FOR SEALING A TELEPHONE HANDSET

(75) Inventors: Zhang Yong Mei, Zhong Xin Kai Xuan (CN); Zheng Yong Jian, Guangdong Province (CN)

(73) Assignee: VTech Telecommunications Limited, Hong Kong (HK)

( * ) Notice: Subject to any disclaimer, the term of this patent is extended or adjusted under 35 U.S.C. 154(b) by 28 days.

(21) Appl. No.: 12/199,428

(22) Filed: Aug. 27, 2008

(65) Prior Publication Data

US 2009/0066029 A1   Mar. 12, 2009

Related U.S. Application Data

(60) Provisional application No. 60/970,681, filed on Sep. 7, 2007.

(51) Int. Cl.
*F16J 15/14* (2006.01)
(52) U.S. Cl. .................................. 156/108; 277/316
(58) Field of Classification Search ................ 156/108; 277/316
See application file for complete search history.

(56) References Cited

U.S. PATENT DOCUMENTS

| | | | |
|---|---|---|---|
| 3,597,663 A | 8/1971 | Markarian | |
| 4,405,063 A * | 9/1983 | Wydro et al. | 222/146.5 |
| 6,689,219 B2 * | 2/2004 | Birmingham | 118/669 |
| 6,888,524 B2 * | 5/2005 | Bayrle et al. | 345/88 |
| 7,098,651 B2 | 8/2006 | Matsumoto et al. | |
| 2005/0212990 A1 * | 9/2005 | Robinder | 349/58 |

OTHER PUBLICATIONS

CSL-519 Technical Data Sheet, p. 74, as supplied by Applicant.*
CSL Silicones Inc., "CSL-519 Technical Data Sheet—Heat Conductive Silicone Sealant"; dated Aug. 3, 2005, ISO-9002 .
LOCTITE 598, Henkel Technologies, Sep. 1994 .
LOCTITE 5900, Technical Data Sheet, Henkel Technologies, Apr. 2006.

* cited by examiner

*Primary Examiner*—Kat Wyrozebski
*Assistant Examiner*—Daniel Lee
(74) *Attorney, Agent, or Firm*—McAndrews, Held & Malloy, Ltd.

(57) ABSTRACT

A system and method for sealing around openings in a telephone handset casing in which externally facing components are positioned. An exemplary method comprises applying a bead of liquid sealant around the opening in a telephone handset casing, allowing the bead to partially cure to form a skin yet still having a malleable consistency, and placing the externally facing component against the bead to deform the bead in conformance with the surface of the component, to provide a close seal between the casing and the component.

20 Claims, 13 Drawing Sheets

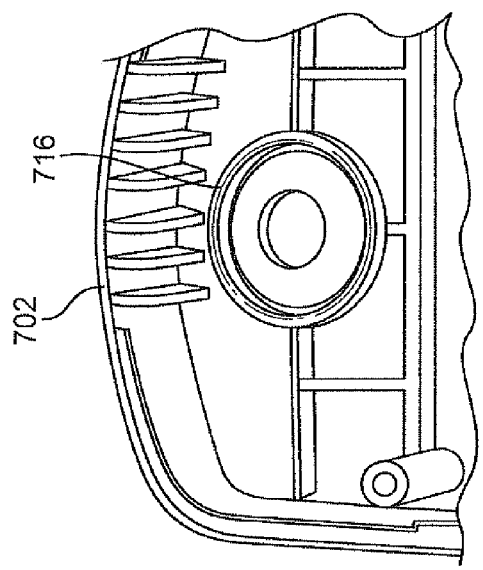
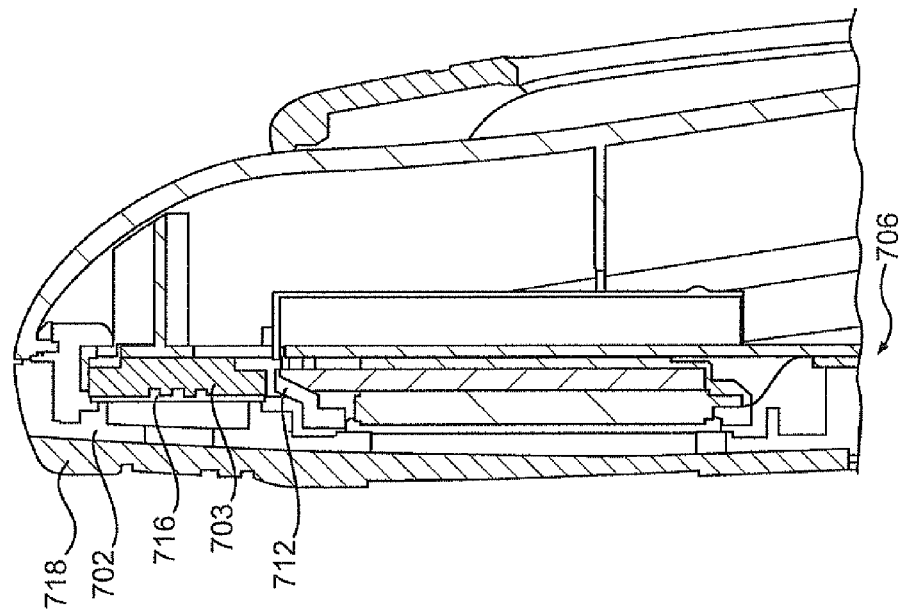

SYSTEM AND METHOD FOR SEALING A TELEPHONE HANDSET

This application claims the benefit of U.S. Provisional Application No. 60/970,681, filed Sep. 7, 2007, which is herein incorporated by reference in its entirety.

BACKGROUND

1. Field of the Invention

The present invention relates generally to telephone handsets and, more particularly, to a system and method for sealing around openings in a telephone handset casing in which externally facing components are positioned, such as liquid crystal displays, audio receivers, and audio speakers.

2. Background of the Invention

Modern telephone handsets, such as cordless telephones and cellular telephones, are typically constructed of an outer plastic or metal casing having openings in which various externally facing components are positioned. Such components include, for example, liquid crystal displays (LCDs), audio speakers, and audio receivers. A component is positioned in an opening of the telephone handset casing, sometimes under a transparent cover. The gap between the frame of the opening and the component is preferably sealed to prevent dust and moisture from entering the space between the component and the transparent cover, which could obscure or hinder the operation of the component. For example, if the component is an LCD, the presence of dust, dirt, or other particles can detract from the quality of the display.

To seal the gap between the frame of the opening and the component, a conventional approach has been to apply a foam gasket to the frame of the opening. Pressure sensitive adhesive on one side of the foam gasket holds the gasket to the casing around the perimeter of the opening. The externally facing component presses against this foam gasket to provide the seal.

FIGS. 1A-1C illustrate a conventional foam gasket 102 applied to the inside front half of a telephone handset casing 104, to provide a seal between the casing 104 and an LCD (not shown). In applying the gasket 102, an assembly worker removes the foam gasket 102 from its paper backing 106 as shown in FIG. 1B, thereby exposing the pressure sensitive adhesive on the underside of the gasket 102. Then, the worker manually positions the gasket 102 over the opening 108 in the casing, taking care to properly position and align the gasket 102 with the opening 108. Depending on the skill of the worker, the gasket 102 can often be misaligned and partially extending into the opening 108, which can obscure a portion of the LCD, compromise the aesthetics of the telephone handset, and prevent an adequate seal between the LCD and the casing. The pressure sensitive adhesive can also frustrate attempts to remove and re-position the foam gasket without damaging it. The manual process of removing and carefully applying the gasket is also time-consuming. In addition, the foam gaskets are typically die-cut out of full sheets of foam, which creates considerable foam product waste in the areas within and between the foam gaskets, as shown in FIG. 2.

Thus, there remains a need for a system and method for adequately sealing components to openings in a telephone handset casing.

BRIEF SUMMARY OF THE INVENTION

An embodiment of the present invention provides a system and method for sealing an opening in a telephone handset casing. According to an exemplary method, a liquid sealant is robotically applied to the casing around the perimeter of the opening. The liquid sealant can be applied in advance of assembly to allow the liquid sealant to set to an appropriate viscosity, tackiness, and malleability, and to allow a number of handsets to be prepared in inventory before beginning the assembly process. After the handsets are automatically prepared with the liquid sealant and are ready for assembly, an externally facing component, such as an LCD, is placed over the opening and in contact with the liquid sealant. Thus, for example, in the case of an LCD, the portions of the LCD nearest its outer edges contact the liquid sealant to seal the gap between the LCD and the casing.

Using a robot to dispense the liquid sealant around the casing opening, the present invention automatically and precisely applies the liquid sealant, and eliminates the problems associated with foam gaskets, including misalignment, the time and cost of manual labor, and material waste. By precisely placing the sealant and allowing the sealant to set to an appropriate malleability, the entire perimeter of a component placed in an opening can contact the liquid sealant and press against the malleable liquid sealant to conform to the shape of the component, including any imperfections in the shape of the component. This conforming contact effectively keeps dust, moisture, and other contaminates out of a space in between the component and a transparent cover over the component. In addition, the automatic process is much more consistent and much less time-consuming than the conventional foam gasket methods.

The conforming contact provided by pressing a component against the liquid sealant when the sealant is malleable also provides surprising and unexpected benefits in the operation of the telephone handset after assembly. For example, the liquid sealant can conform to imperfections in the surface of an LCD and can surround and conform to the front face, the edge, and even the back face of the LCD. With this conforming contact and the flexibility of the liquid sealant after is has set, the present invention can dampen vibration of the LCD, provide shock absorption, and accommodate the flexure of the LCD and casing that can occur as the telephone handset is handled by a user.

BRIEF DESCRIPTION OF THE DRAWINGS

FIGS. 7A and 7B are schematic diagrams illustrating a liquid-applied bead used to seal between an externally facing audio receiver and a casing front, according to an embodiment of the present invention.

DETAILED DESCRIPTION OF THE INVENTION

Figure 1A:
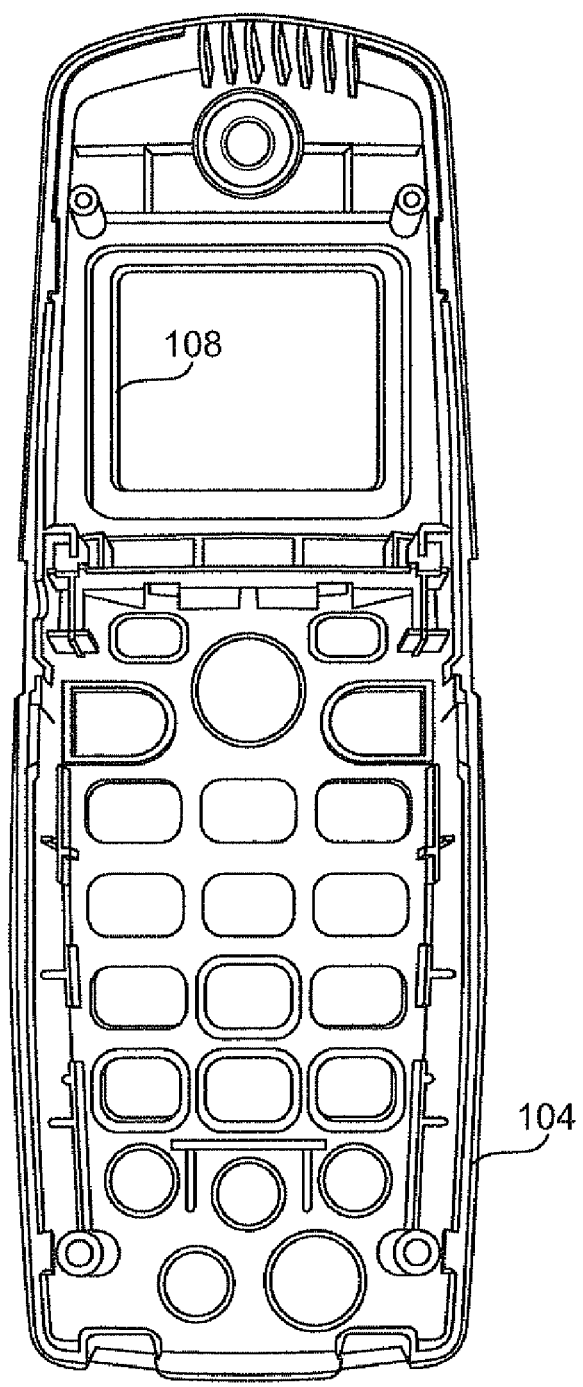
FIGS. 1A-1C are schematic diagrams that illustrate a conventional foam gasket applied to the inside front half of a telephone handset casing, to provide a seal between the casing and an LCD.
Figure 1B:
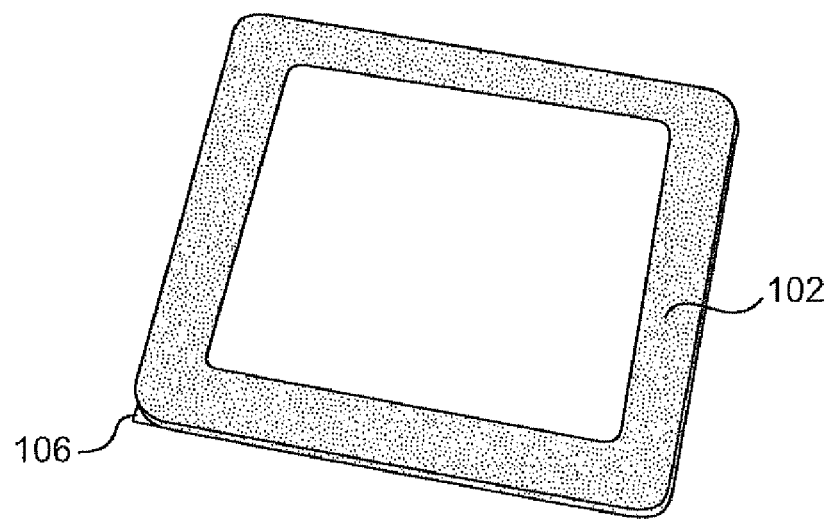
Figure 1C:
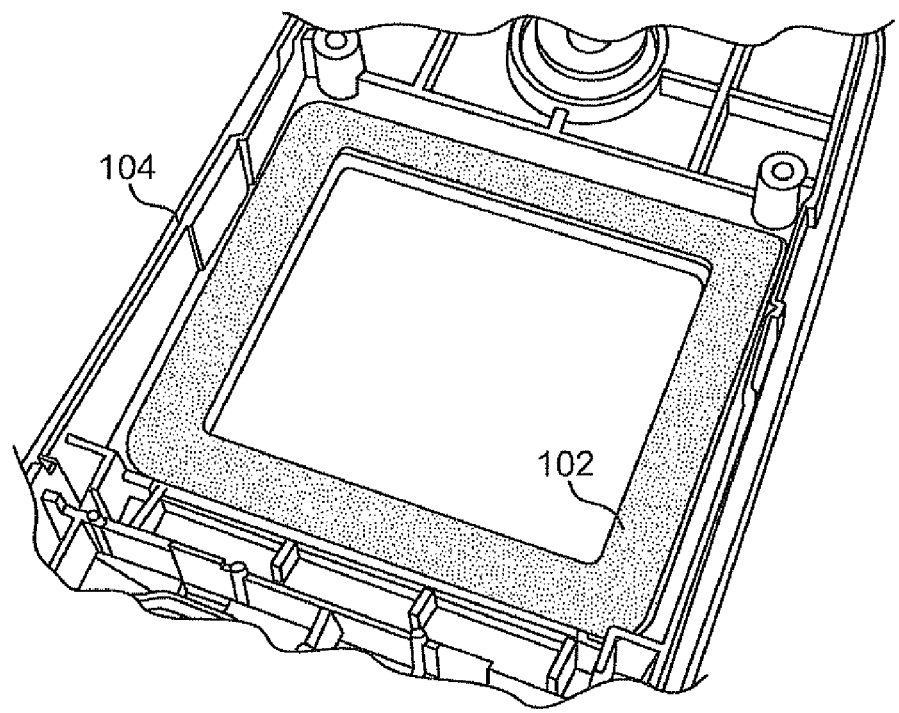
Figure 2:
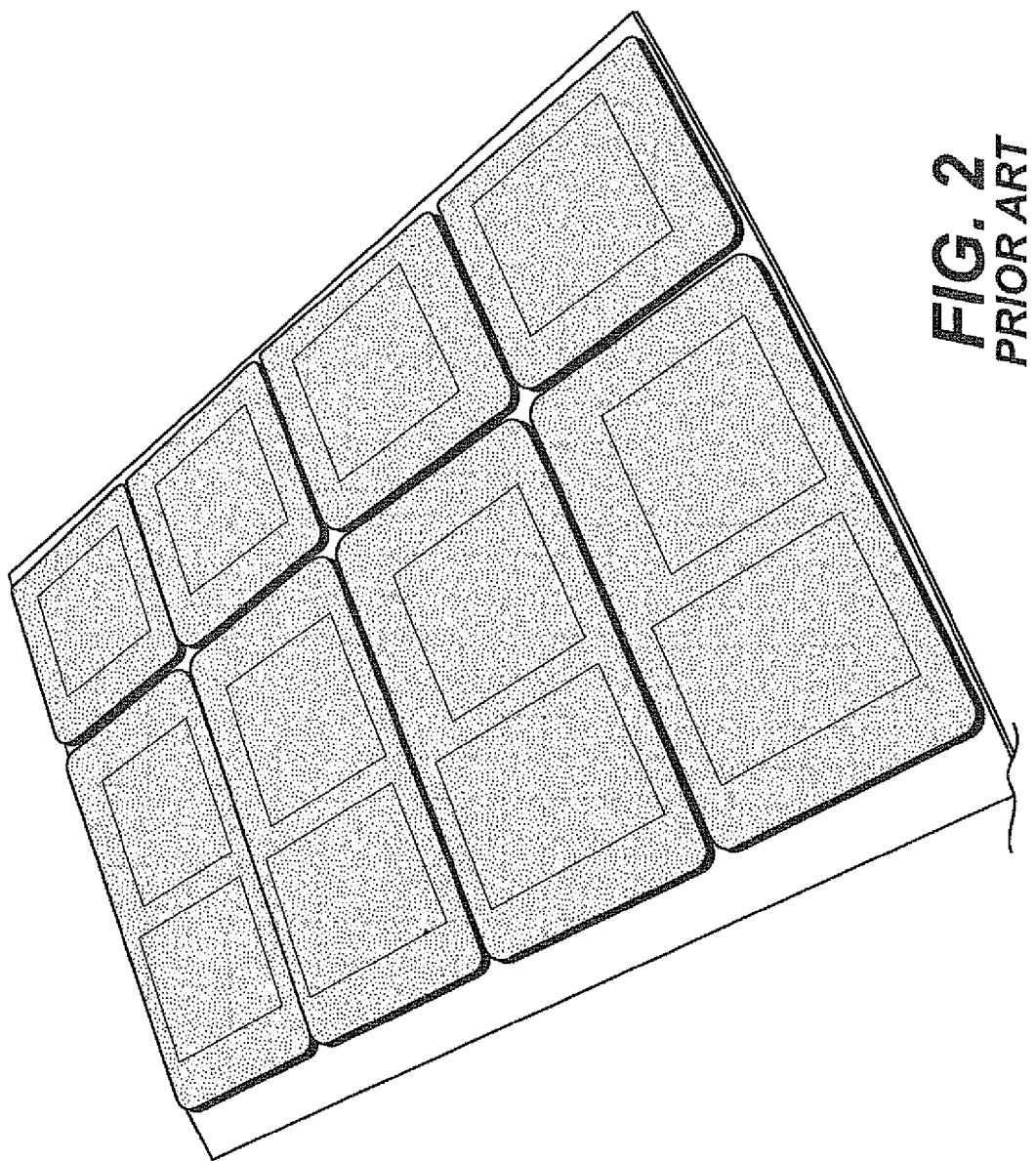
FIG. 2 is a schematic diagram that illustrates a sheet of foam gaskets.
Figure 3A:
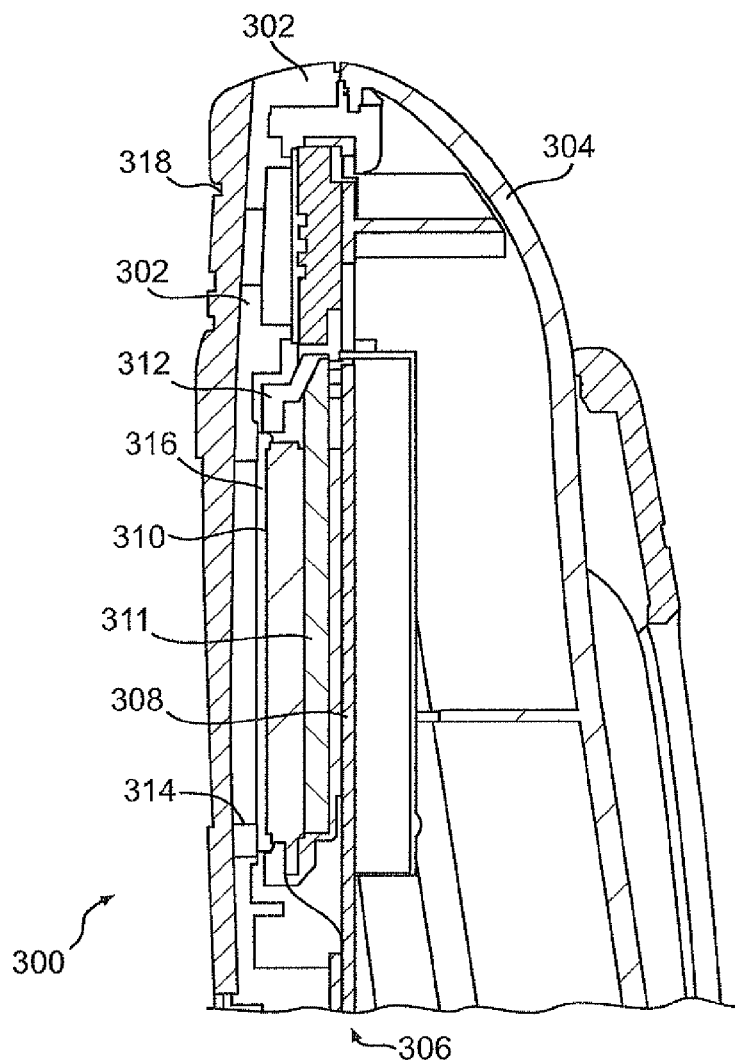
FIG. 3A is a schematic diagram that illustrates a partial cross-sectional view of a telephone handset, according to an embodiment of the present invention.

An embodiment of the present invention provides a system and method for sealing around an opening in a telephone handset casing using a liquid-applied bead. FIG. 3A illustrates a partial cross-sectional view of a telephone handset 300, according to an embodiment of the present invention. As shown, telephone handset 300 comprises a casing front 302 and a casing back 304. An electronic component chassis 306 is fastened to the casing front 302 and includes, among other components, a printed circuit board (PCB) 308 and an LCD 310 and LCD diffuser 311 secured in an LCD holder 312. The LCD 310 is positioned facing out through an opening 314 in the casing front 302.

A liquid-applied bead 316 seals the perimeter portions of the LCD 310 to the opening 314 of the casing front 302. A transparent lens 318 is affixed over the face of the casing front 302, covering and protecting the opening 314 and the LCD 310 and furnishing the handset with an aesthetically pleasing finished appearance. Bead 316 prevents dust and moisture from entering the space between the lens 318 and the LCD 310 and obscuring the display. The transparent lens 318 is sealed to casing front 302 by, for example, double-sided adhesive tape to provide additional protection against dust and moisture, and to furnish an aesthetically pleasing finished appearance.

The liquid-applied bead 316 can be made of, for example, a self-growth foam or an elastomer sealant, such as silicone sealant. Bead 316 can be applied to casing front 302 before assembly of the handset 300 in an off-line pre-production process. This pre-production process allows time for the liquid-applied bead to adhere to the casing front 302 and to partially cure or set to an optimal consistency, ready to receive, adhere to, and conform to (e.g., by partially deforming) an LCD face. Examples of suitable materials for bead 316 include silicone sealants such as Loctite 598™ or Loctite 5900™ produced by Henkel Corporation of Dusseldorf, Germany and CSL-519 heat conductive silicone sealant produced by CSL Silicones Inc. of Ontario, Canada.

Figure 3B:
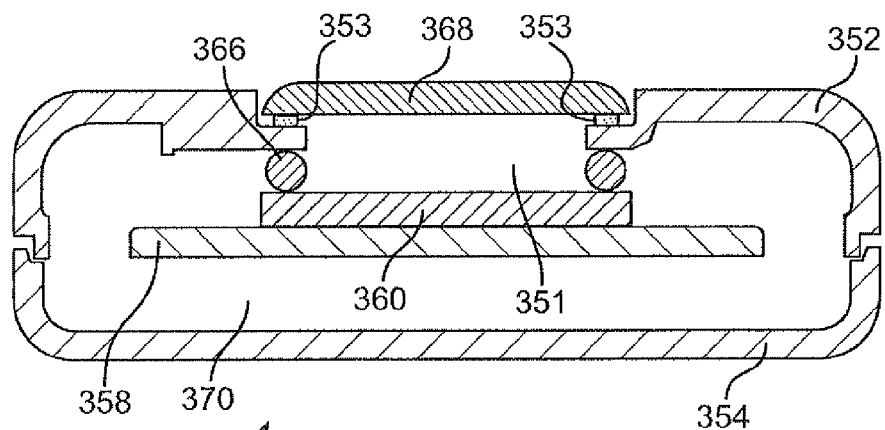
FIG. 3B is a cross-sectional view of an exemplary telephone handset, which illustrates a space sealed by a liquid-applied bead, according to an embodiment of the present invention.

FIG. 3B is a cross-sectional view of an exemplary telephone handset 350, which illustrates a space 351 sealed by the liquid-applied bead 366. As shown, it is important to keep dust, dirt, and other contaminates out of space 351 to ensure a clear view of the LCD 360 (which is connected to PCB 358) through transparent lens 368. As shown, bead 366 stops contaminates in the interior space 370 of the handset 350 (defined by casing front 352 and casing back 354) from entering space 351. An adhesive seal 353 is also provided between the lens 368 and casing front 352 to prevent contaminates external to the handset 350 from entering space 351. Adhesive seal 353 could be, for example, double-sided adhesive tape. In a further embodiment, adhesive seal 353 could be a liquid-applied adhesive that provides both a strong connection between lens 368 and casing front 352, and also a seal against contaminates.

Figure 4:
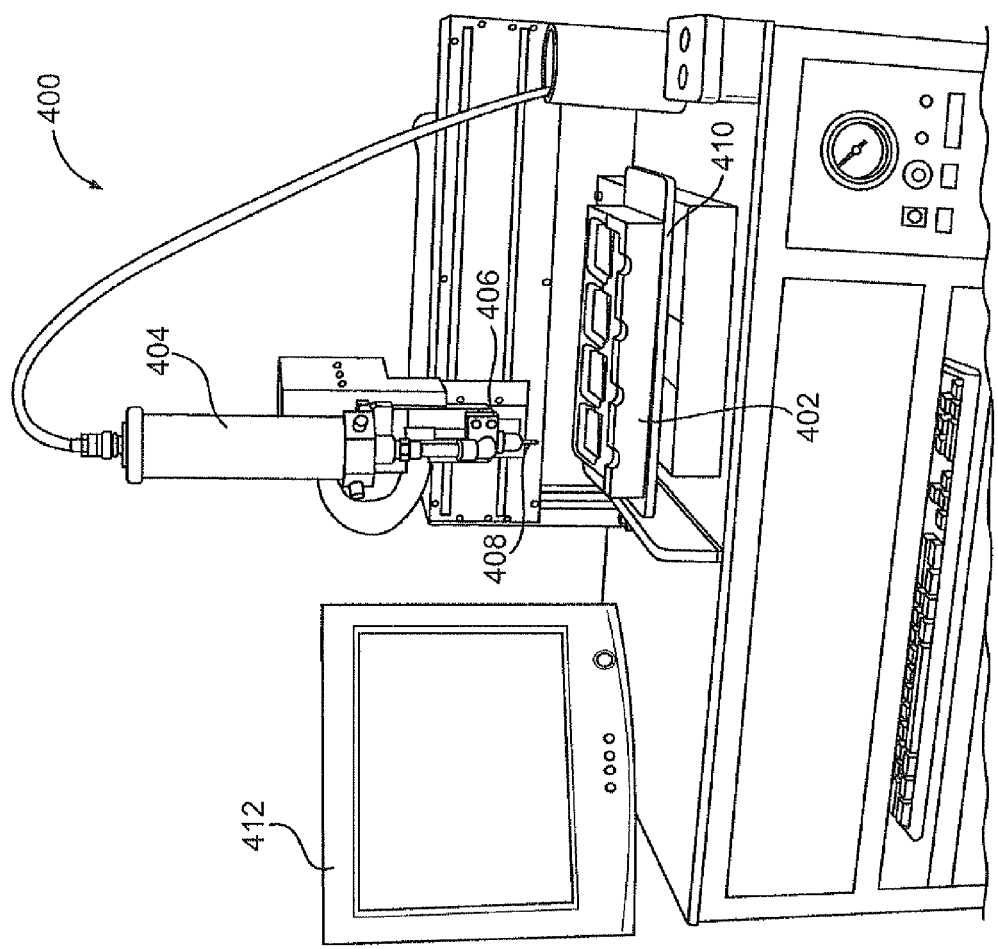
FIG. 4 is a schematic diagram that illustrates an exemplary system and process for preparing a handset casing front with a liquid-applied bead, according to an embodiment of the present invention.

FIG. 4 illustrates an exemplary process and apparatus for preparing a handset casing front with a bead 316 (as shown in FIG. 3A). As shown in FIG. 4, a blank telephone handset casing front is placed in a holder 402 of a robotic liquid dispensing apparatus 400. In this example, multiple handset casings can be inserted at one time in a multi-compartment tray 402 resting on a movable work table 410. The liquid dispensing apparatus 400 includes a pneumatic cylinder 404 in which the liquid sealant is loaded and a dispenser head 406. Dispenser head 406 has a nozzle 408 through which the liquid sealant is forced and applied to the casings.

The apparatus 400 can be controlled, for example, by a programmable computer 412, to apply a bead of a desired thickness at precise locations on a series of casings. One or both of the dispenser head 406 and the work table 410 can move (e.g., in x-, y-, and z-directions) to quickly and precisely place the bead. To ensure this automatic and precise placement, computer 412 can control parameters such as the amount, timing, and constancy of the pressure applied to the liquid sealant in cylinder 404, and the location and speed of the head 406 and table 410. The size of the nozzle 408 can also be configured to achieve a desired bead thickness.

Programmable computer 412 controls the relative displacements of the head 406 and table 410 in a three-dimensional space. In operation, one or both of the head 406 and table 410 can move through a pre-defined trajectory, while at the same time, the liquid sealant is ejected through the nozzle 408. For example, with the LCD opening 314 shown in FIG. 3A, apparatus 400 could apply a bead in a continuous line around the edge of the rectangular opening, starting and stopping at one corner. After applying such a bead on a first casing front, dispensing of the sealant would pause, the head would move to the next casing front, and the sealant dispensing would then continue around the second casing front.

Figure 5A:
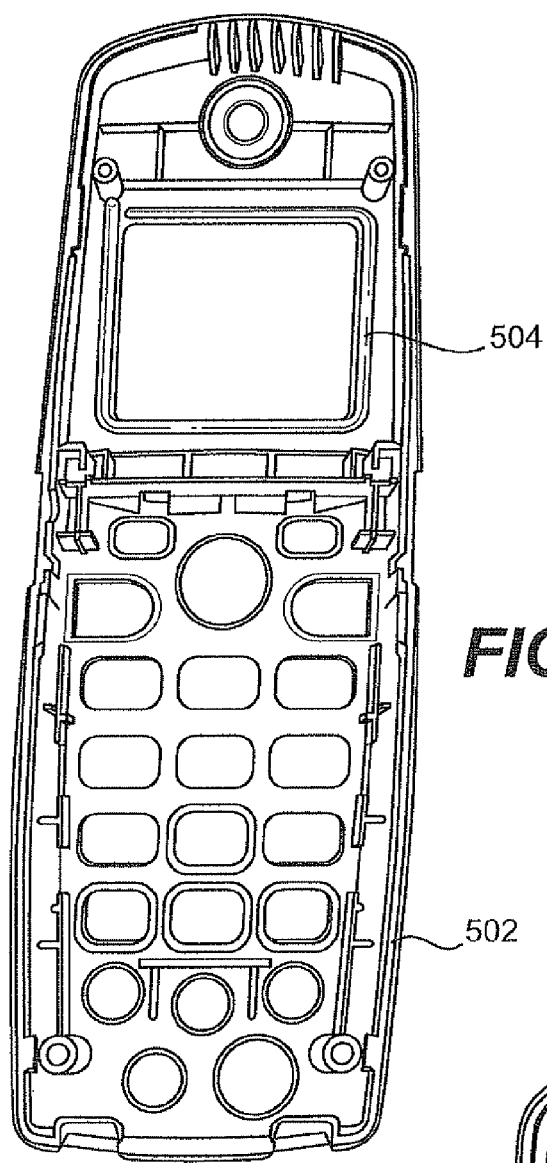
FIGS. 5A and 5B are schematic diagrams that illustrate a casing front having a liquid-applied bead, according to an embodiment of the present invention.
Figure 5B:
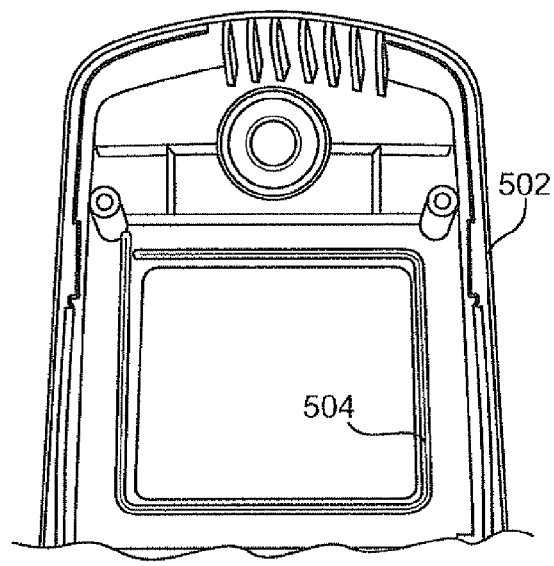

In this manner, the present invention can prepare an inventory of many casing fronts, each having the bead, ready to be picked up and used in the assembly process for a telephone handset. As an example of this process, FIGS. 5A and 5B illustrate a casing front 502 having a liquid-applied bead 504. As shown, bead 504 is a continuous line of sealant starting at one corner of the opening, extending around the perimeter of the opening, and returning to the starting corner. In an embodiment of the present invention, the bead 504 is applied within about 0.5-1.0 mm of the edge of the opening (i.e., the distance between edge of the opening and the side of the bead nearest the opening is about 0.5-1.0 mm). Optionally, the casing front 502 can have a groove or recess into which the sealant is dispensed and held. In an exemplary implementation, 8-12 handsets at a time are prepared with a liquid-applied bead 504 and set aside in trays.

An important aspect of the present invention is the time allowed for the liquid-applied bead to partially cure to a consistency suitable for incorporation into a telephone handset assembly process. The bead can be allowed to set such that it is no longer fluid and has formed a "skin." At this state, the bead has not fully cured, is still malleable, and can be deformed to conform to a surface with which it comes into contact. The malleable bead can therefore establish a close seal between the components. In addition, even after the bead is fully cured, the elastomeric properties of the bead (e.g., flexibility) in conjunction with the close conforming fit, can provide beneficial shock absorption and vibration dampening.

In one exemplary implementation of the present invention, CSL-519 sealant is applied to a handset casing front and allowed to partially cure for preferably about 20-30 minutes, which has been found to be when the sealant forms a skin and is dry, yet is still favorably elastic and malleable. According to the technical data sheets for CSL-519, at 25° C. (77° F.) and 50% relative humidity, the skin-over time for the CSL-519 is about 10-15 minutes and full cure time is 24 hours. In the pre-production process of preparing the casing fronts with the bead, the sealant is applied and set aside for at least ten minutes, without contacting the bead. After preferably about 20-30 minutes, and before the full curing of the sealant (which occurs generally in about twenty-four hours), the casing front can be used in the production line assembly.

Figure 6A:
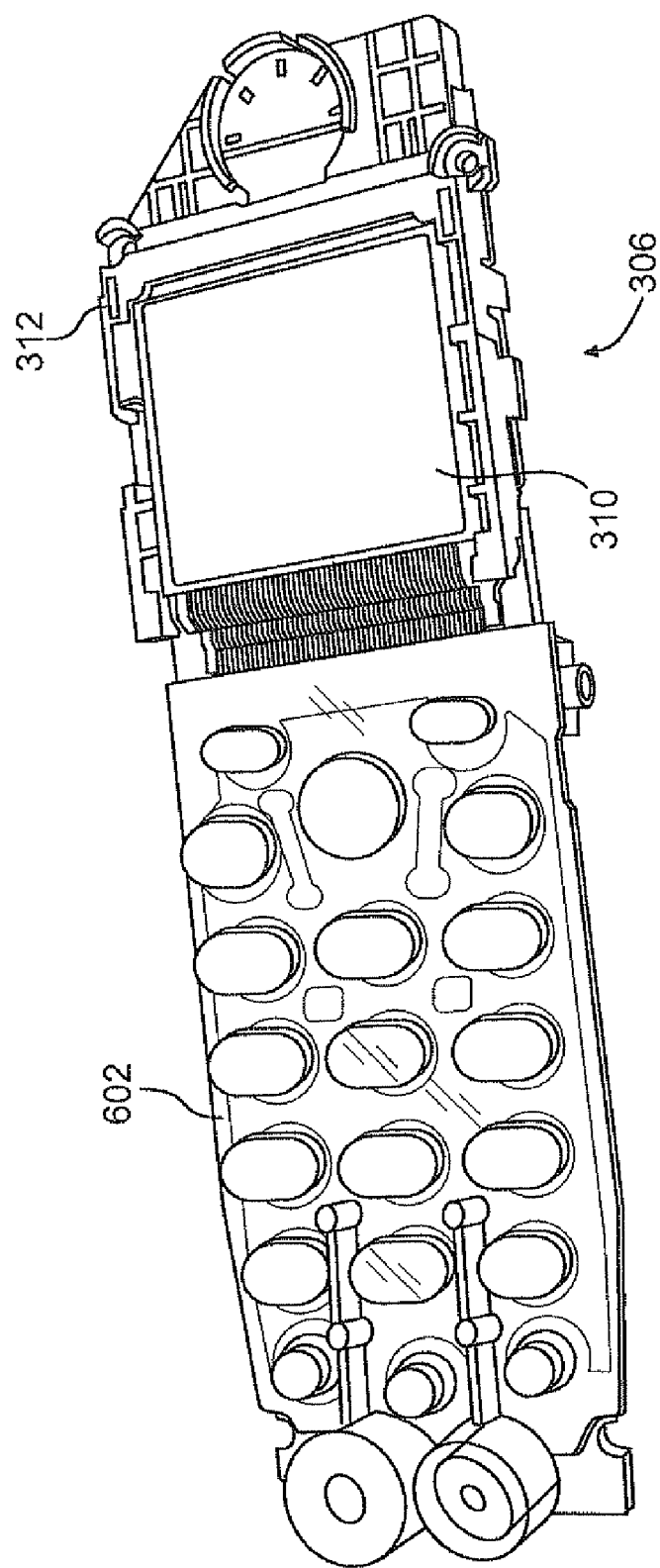
FIGS. 6A-6H are schematic diagrams that illustrate an exemplary process for assembling a telephone handset using a casing front to which a bead has already been applied and allowed to partially cure to an appropriate consistency, according to an embodiment of the present invention.

FIGS. 6A-6H illustrate an exemplary process for assembling a telephone handset using a casing front to which a bead has already been applied and allowed to partially cure to an appropriate consistency. FIG. 6A illustrates an assembled electronic component chassis 306 of a telephone handset, showing the LCD 310, the LCD holder 312, and a keypad 602. This chassis 306 is ready to be inserted into a casing front.

Figure 6B:
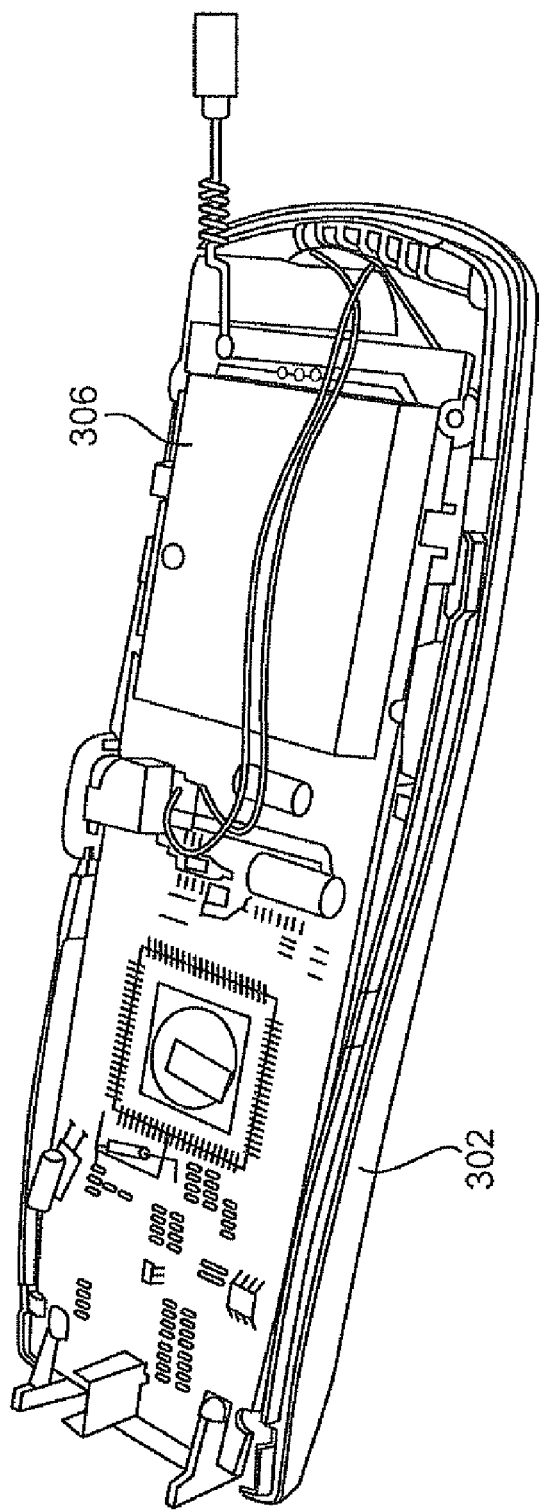

FIG. 6B illustrates the chassis 306 of FIG. 6A flipped over and inserted into a casing front 302 having a liquid-applied bead (not shown). In this step, the LCD contacts the malleable bead, deforming the bead into a shape that matches that of the LCD. The chassis 306 and casing front 302 can have cooperative guide members, such as corresponding guide pins and openings, that align the two parts as the chassis 306 is connected to the casing front 302, so that the LCD lowers onto the bead and over the opening in an aligned fashion. These alignment devices can avoid getting sealant on the LCD at undesirable locations.

Figure 6C:
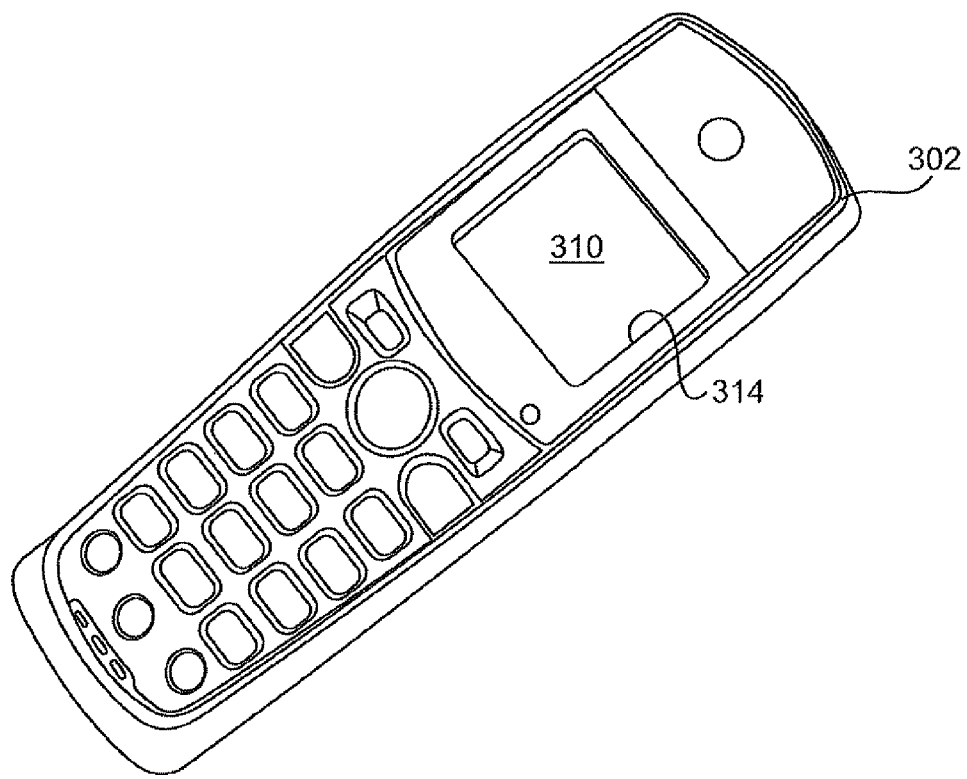

FIG. 6C shows the opposite side of the partially assembled handset of FIG. 6B. As shown, the LCD 310 is viewable through the opening 314 of the casing front 302. The precisely applied and sized bead cannot be seen at the edges of the opening 314.

Figure 6D:
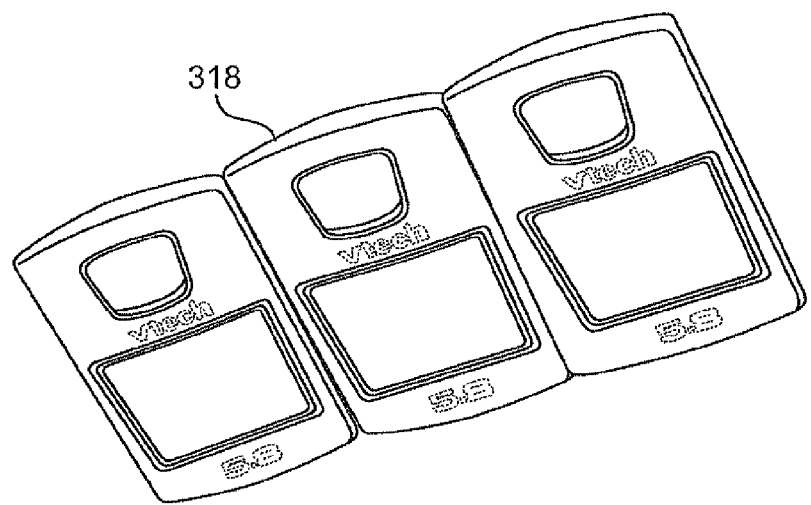
Figure 6E:
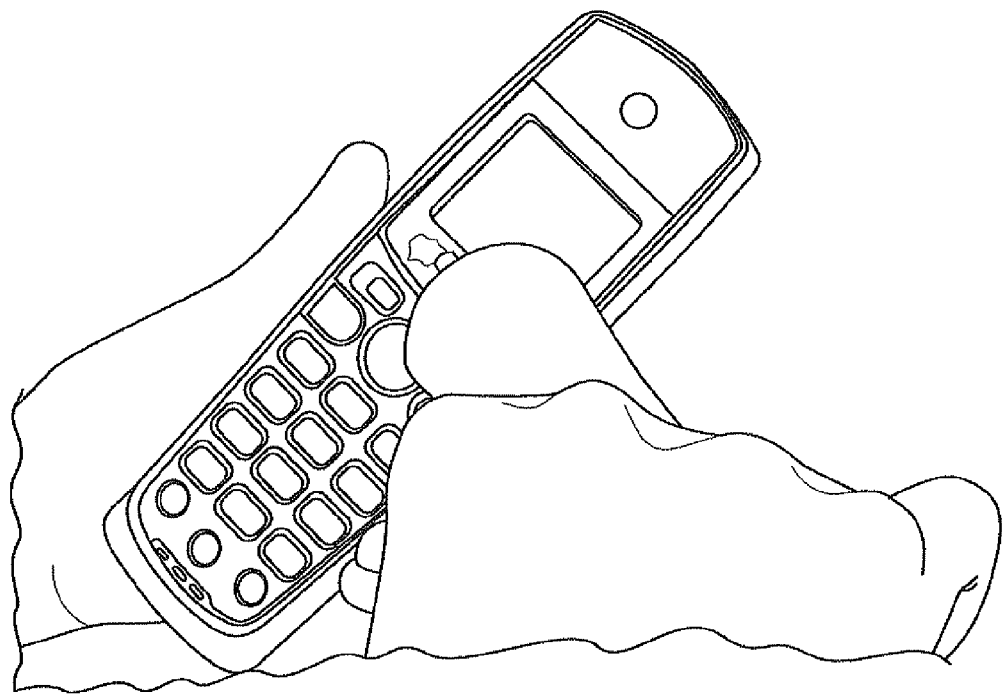
Figure 6F:
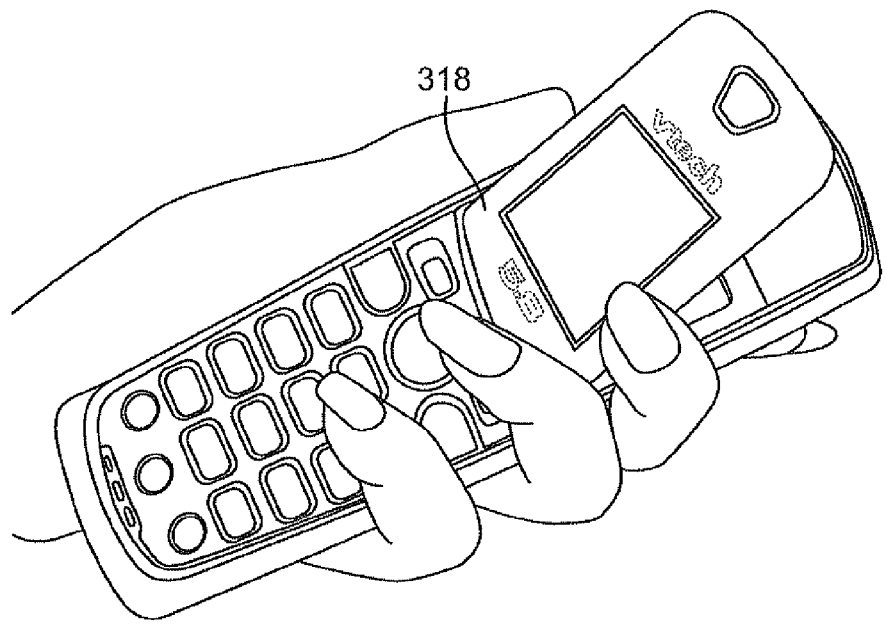

FIG. 6D illustrates three handset lenses 318 that fit over the upper portion (above keypad 602) of the handset to provide a finished look and to provide further protection for the LCD 310. A liquid adhesive is applied to the front of the casing front as shown in FIG. 6E. A handset lens 318 is then placed over the upper portion of the handset and held in place by the adhesive as shown in FIG. 6F. This completes assembly of the front half of the telephone handset. Optionally, instead of liquid adhesive, handset lens 318 could be affixed to and sealed to casing front 302 using double-sided adhesive tape.

Figure 6G:
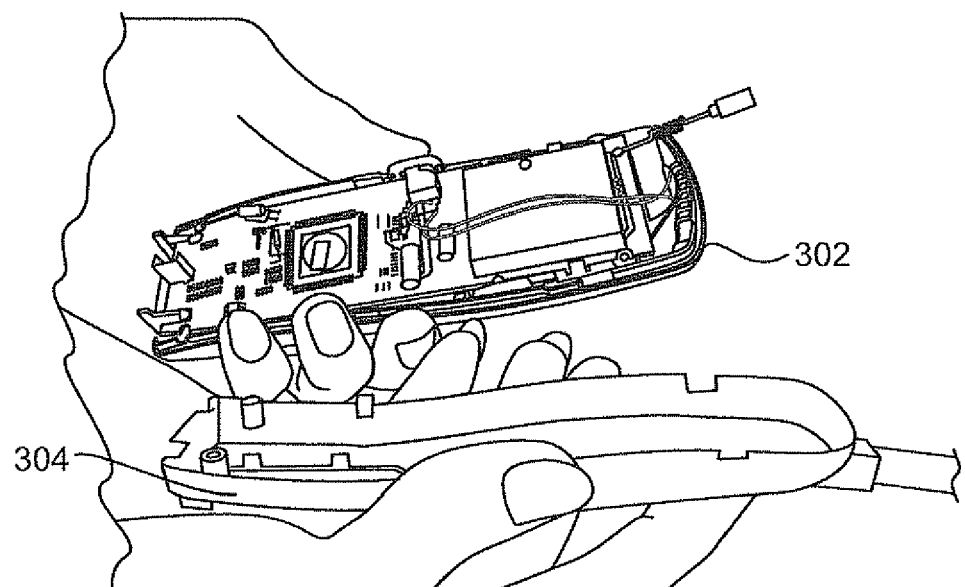
Figure 6H:
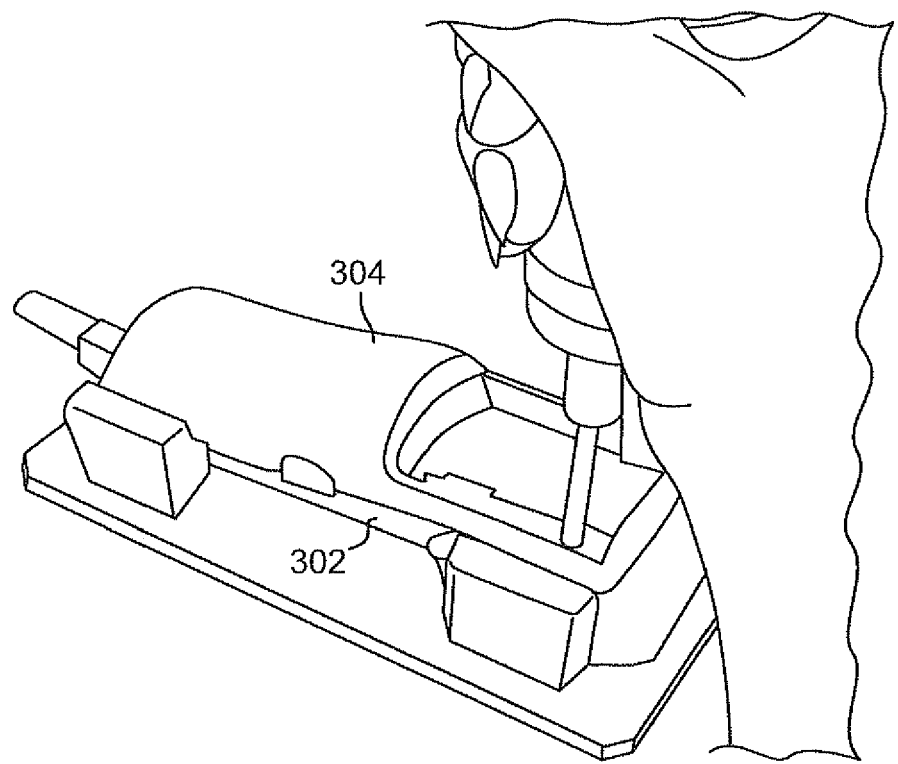

Finally, to complete assembly of the handset, a casing back 304 is attached to the casing front 302, in this case, by screw fasteners, as shown in FIGS. 6G and 6H.

As described above, the present invention can be applied to seal any opening in a telephone handset. FIGS. 7A and 7B illustrate a further example in which a liquid-applied bead is used to seal between an externally facing audio receiver 703 and a casing front 702. The partial cross-sectional view of FIG. 7A shows the audio receiver 703 and casing front 702 sealed by the liquid-applied bead 716. In this case, the audio receiver 703 is part of the electronic component assembly 706 and is held to the casing front 702 by a holder 712 that holds both the audio receiver 703 and the LCD 710. A lens 718 is attached over the casing front 702. The liquid-applied bead 716 helps keep contaminates from the interior of the handset from entering the space between the audio receiver 703 and the lens 718.

FIG. 7B illustrates the casing front 702 with the bead 716 applied and before assembly with the electronic component chassis 706. In addition to LCD, audio receiver, and audio speaker openings, the bead of the present invention can be used to seal any other opening of a handset casing. Thus, notwithstanding the particular benefits associated with using the liquid-applied bead to seal openings for LCDs and audio speakers or receivers, the present invention should be considered broadly applicable to sealing any component to an opening in a telephone handset casing.

In an aspect of the present invention, the liquid-applied bead is sized and located to contact not only the face of an externally facing component, but the edge and even the back side of the component. This extensive contact holds the casing and component in place relative to each other, and provides further unexpected benefits related to shock absorption, vibration dampening, and sealing. With a traditional foam gasket, the foam material allows only contact with the face of the component. In the present invention, however, the malleable bead can deform around the component to envelope the edge of the component.

Figure 8A:
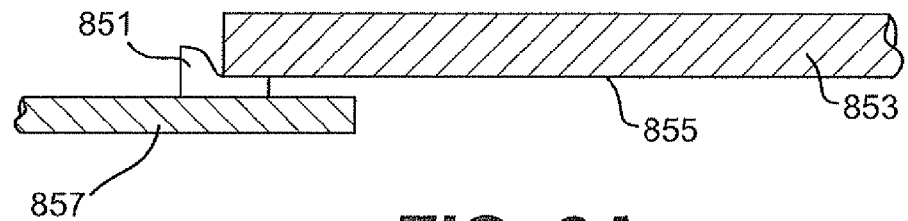
FIG. 8A is a schematic diagram of a cross-sectional view of a seal provided by a conventional foam gasket, used between an externally facing component and a handset casing.
Figure 8B:
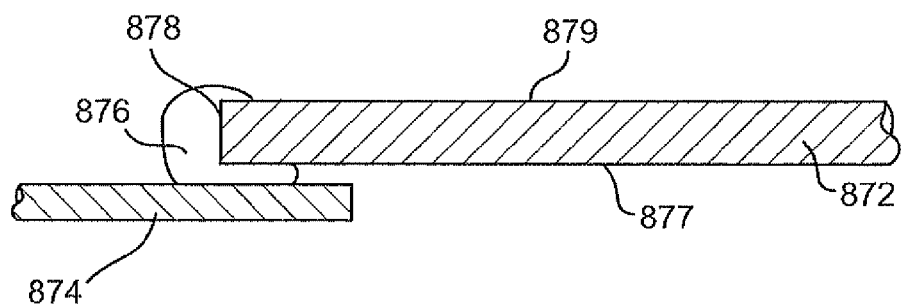
FIG. 8B is a schematic diagram of a cross-sectional view of a seal provided by a liquid-applied bead between an externally facing component and a handset casing, according to an embodiment of the present invention.

FIGS. 8A and 8B illustrate the differences between a conventional foam gasket (FIG. 8A) and the present invention's conforming bead (FIG. 8B). As shown in FIG. 8A, the foam gasket 851 applied to the casing 857 contacts only the face 855 of the component 853. By contrast, in FIG. 8B, the bead 876 applied to the casing 874 contacts the front face 877, the edge 878, and the back face 879 of the component 872. The more extensive contact between the bead 876 and the component 872 provides a better seal and better resilience and stability against shock, vibration, and flexure.

Figure 8C:
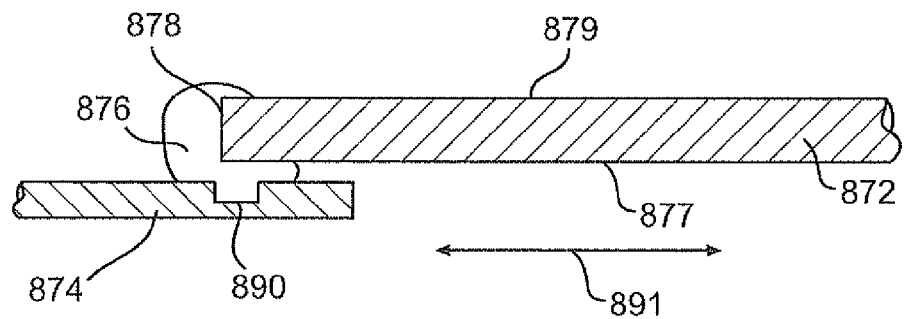
FIG. 8C is a schematic diagram of a cross-section view of another seal provided by a liquid-applied bead between an externally facing component and a handset casing having a recess, according to an embodiment of the present invention.

In a further embodiment of the present invention, a casing front can have a recess or groove into which the liquid-applied bead is dispensed, which can help retain the liquid sealant until it cures sufficiently enough for assembly. FIG. 8C illustrates an example of a groove or recess 890 into which bead 876 is dispensed. In addition to retaining the bead, the groove 890 can enhance lateral stability of the connection between the component 872 and the casing 874, for example, in the direction represented by the arrow 891. Similar grooves could also be incorporated into the design of the component 872.

Although embodiments of the present invention relate to sealing openings in a telephone handset, the invention is also applicable to other electronic devices such as telephone base stations, which also can have LCDs and audio speakers and receivers covered by transparent lenses.

Overall, the present invention reduces assembly time, minimizes labor costs, avoids material waste, and improves the quality of a telephone handset.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for sealing an opening of a telephone handset casing comprising:
   robotically dispensing a bead of sealant in liquid form around a perimeter of the opening on the inside of the casing;
   allowing the bead to partially cure until the bead forms a skin, yet is still malleable, wherein allowing the bead to partially cure comprises waiting about 20-30 minutes before placing the component over the opening; and
   placing a component over the opening from inside the casing, such that the component contacts the bead and deforms the bead to conform to the component.

2. The method of claim 1, the component comprising a liquid crystal display.

3. The method of claim 1, the sealant comprising silicone sealant.

4. The method of claim 1, wherein the sealant has a skin-over time of about 10-15 minutes at 25° C. and 50% relative humidity.

5. The method of claim 1, wherein placing a component over the opening comprises placing the component such that the bead deforms around an edge of the component and contacts both a face of the component that generally spans the opening and also the edge of the component that is generally perpendicular to the face.

6. A method for assembling a telephone handset, the method comprising:
   providing a casing front having an opening, the casing front having an interior and an exterior side;
   robotically dispensing a bead of sealant in liquid form around a perimeter of the opening on the interior side of the casing front;
   allowing the bead to partially cure until the bead forms a skin, yet is still malleable, wherein allowing the bead to partially cure comprises waiting about 20-30 minutes before placing the component over the opening;
   placing a liquid crystal display over the opening on the interior side of the casing front, such that the liquid crystal display contacts the bead and deforms the bead to conform the bead to the liquid crystal display;
   adhering a transparent cover to the exterior side of the casing front over the opening and the liquid crystal display by applying an adhesive between the transparent cover and the casing front, wherein the adhesive and the bead seal a space between the liquid crystal display and the transparent cover; and
   affixing a casing back to the casing front.

7. The method of claim 6, the sealant comprising silicone sealant.

8. The method of claim 6, wherein the sealant has a skin-over time of about 10-15 minutes at 25° C. and 50% relative humidity.

9. The method of claim 6, wherein adhering the transparent cover comprises applying double-sided adhesive tape between the transparent cover and the casing front.

10. The method of claim 6, wherein adhering the transparent cover comprises applying a liquid adhesive between the transparent cover and the casing front.

11. The method of claim 6, the sealant comprising self-growth foam.

12. The method of claim 6, wherein robotically dispensing a bead of sealant comprises dispensing the sealant in a continuous line around the perimeter of the opening.

13. The method of claim 6, wherein the bead is applied within about 0.5 to 1.0 mm of an edge of the opening.

14. The method of claim 6, wherein the casing front comprises a groove or recess into which the sealant is dispensed.

15. The method of claim 6, wherein the liquid crystal display and the casing front have cooperative guide members that align the two parts as the liquid crystal display is placed over the opening.

16. The method of claim 6, wherein the bead conforms to the liquid crystal display such that the bead contacts three surfaces of the liquid crystal display, including a face of the liquid crystal display that generally spans the opening, an edge of the liquid crystal display that extends around the perimeter of the liquid crystal display and is generally perpendicular to the face, and a back surface of the liquid crystal display.

17. A method for assembling a plurality of telephone handsets, comprising:
   providing a plurality of casing fronts, each casing front having an opening, an interior side, and an exterior side; and
   for each casing front of the plurality of casing fronts:
      robotically dispensing a bead of sealant in liquid form around a perimeter of the opening on the inside of the casing;
      allowing the bead to partially cure until the bead forms a skin, yet is still malleable, wherein allowing the bead to partially cure comprises waiting about 20-30 minutes before placing the component over the opening; and
      placing a component over the opening from inside the casing, such that the component contacts the bead and deforms the bead to conform to the component.

18. The method of claim 17, wherein the placing a component comprises placing a liquid crystal display over the opening on the interior side of the casing front, such that the liquid crystal display contacts the bead and deforms the bead to conform the bead to the liquid crystal display.

19. The method of claim 18, further comprising, for each casing front of the plurality of casing fronts, adhering a transparent cover to the exterior side of the casing front over the opening and the liquid crystal display by applying an adhesive between the transparent cover and the casing front, wherein the adhesive and the bead seal a space between the liquid crystal display and the transparent cover.

20. The method of claim 17, wherein, for each casing front of the plurality of casing fronts, the bead conforms to the component such that the bead contacts three surfaces of the component, including a face of the component that generally spans the opening, an edge of the component that extends around the perimeter of the component and is generally perpendicular to the face, and a back surface of the component.

* * * * *